United States Patent
Jia (10) Patent No.: US 10,165,097 B2
(45) Date of Patent: Dec. 25, 2018

(54) CALL PROCESSING METHOD AND DEVICE (71) Applicant: ZTE Corporation, Shenzhen (CN)

(72) Inventor: Xin Jia, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 15/521,447

(22) PCT Filed: Jan. 26, 2015

(86) PCT No.: PCT/CN2015/071576
§ 371 (c)(1),
(2) Date: Apr. 24, 2017

(87) PCT Pub. No.: WO2015/184836
PCT Pub. Date: Dec. 10, 2015

(65) Prior Publication Data
US 2017/0339263 A1 Nov. 23, 2017

(30) Foreign Application Priority Data
Oct. 23, 2014 (CN) .......................... 2014 1 0571025

(51) Int. Cl.
H04M 1/247 (2006.01)
G06F 3/0482 (2013.01)
H04M 1/725 (2006.01)
H04M 3/493 (2006.01)
H04M 19/04 (2006.01)

(52) U.S. Cl.
CPC .......... *H04M 1/247* (2013.01); *G06F 3/0482* (2013.01); *H04M 1/2477* (2013.01); *H04M 1/72519* (2013.01); *H04M 3/493* (2013.01); *H04M 19/04* (2013.01); *H04M 1/2471* (2013.01); *H04M 2203/254* (2013.01); *H04M 2250/74* (2013.01)

(58) Field of Classification Search
CPC ..... H04M 2203/251; H04M 2203/254; H04M 1/247; H04M 2201/38; H04M 2203/252; H04M 2203/253
USPC ........ 379/265.09, 242, 265.05, 88.11, 88.14, 379/88.13
See application file for complete search history.

(56) References Cited

U.S. PATENT DOCUMENTS

| 6,920,425 B1 * | 7/2005 | Will .................. H04M 3/493 379/88.13 |
| 8,000,454 B1 * | 8/2011 | Or-Bach ............... G06Q 20/10 379/100.14 |
| 2008/0039056 A1 | 2/2008 | Mathews |

(Continued)

FOREIGN PATENT DOCUMENTS

| CN | 102306430 A | 1/2012 |
| CN | 103002166 A | 3/2013 |
| CN | 103428377 A | 12/2013 |

OTHER PUBLICATIONS

International Search Report for corresponding application PCT/CN2015/071576 filed on Jan. 26, 2015; dated Jul. 29, 2015.

(Continued)

*Primary Examiner* — Thjuan K Addy
(74) *Attorney, Agent, or Firm* — Cantor Colburn LLP (57) ABSTRACT A call processing method and device are provided. In the call processing method, voice guidance in a call is converted into visual data; and the visual data is displayed as a visual menu to present content of the voice guidance.

18 Claims, 6 Drawing Sheets

Voice guidance in a call is converted into visual data — S102

The visual data is displayed as a visual menu to present content of the voice guidance through the visual menu — S104

(56) References Cited

U.S. PATENT DOCUMENTS

2001/0103559      5/2011   Andrews
2011/0103559 A1  5/2011   Andrews
2014/0056418 A1  2/2014   Sheikh

OTHER PUBLICATIONS

European Search Report for corresponding application EP15803178; Report dated Oct. 6, 2017.

* cited by examiner

1. Press 1 for balance query
2. Press 2 to talk to our representative

CALL PROCESSING METHOD AND DEVICE

TECHNICAL FIELD

The present disclosure relates to the field of communications, and more particularly, to a call processing method and device.

BACKGROUND

Telephone services mainly include two types of services, i.e., automatic voice service and manual service. No matter which type of service is used, the traditional pure voice interactive manner may bring a lot of inconvenience to users and enterprises. In general, after a user dials a hotline, the user may only select the business or service that the user wishes to proceed after listening to the voice broadcast. As the voice broadcast is given progressively, the user has to listen to voice broadcast one level by one level before the user can select the business or service that the user wishes to proceed. Meanwhile, since the user is completely unforeseeable to the next-level menu, the user may operate incorrectly and, as a consequence, have to re-call the user service phone, resulting in lower efficiency. For an enterprise, since the user has poor experience of telephone service, the perception of the user for the corporate image may be inevitably influenced.

There is no effective solution for the problem of poor user experience caused by the voice guidance employed in a call.

SUMMARY

Some embodiments of the present disclosure provide a call processing method and device for solving the problem of poor user experience caused by the voice guidance employed in a call.

According to an embodiment of the present disclosure, a call processing method is provided, which may include the following acts. Voice guidance in a call is converted into visual data. The visual data is displayed as a visual menu to present content of the voice guidance.

In an exemplary embodiment, the act that the voice guidance is converted into the visual data may include the following acts. Indication information is acquired, and in this embodiment, the indication information indicates whether to convert the voice guidance into the visual data. The voice guidance is converted into the visual data when the indication information indicates to convert the voice guidance into the visual data.

In an exemplary embodiment, after the visual data is displayed as the visual menu, the call processing method may further include the following acts. Data input by a user during a voice guidance interaction process is received and the data input by the user is saved.

In an exemplary embodiment, after the data input by the user is saved, the call processing method may further include the following acts. The data is invoked and the data is displayed together with the visual menu.

In an exemplary embodiment, after the visual data is displayed as the visual menu, the call processing method may further include the following acts. A command is received through the visual menu. The command is sent to a provider of the voice guidance.

In an exemplary embodiment, the act that the visual data is displayed as the menu may include at least one of the following acts that: the visual data is displayed as the visual menu in a form of a list, the visual data is displayed as the visual menu in a form of a tree structure, the visual data is displayed as the visual menu in a form of organization architecture, or the visual data is displayed as the visual menu in a form of text display.

In an exemplary embodiment, when the visual data is displayed in the form of the list, in the form of the tree structure, or in the form of the organization architecture, the act that the visual data is displayed as the visual menu may include the following acts. One or more first-level menus are displayed. After receiving a command of displaying a next-level menu of at least one menu in the one or more first-level menus, the next-level menu of the at least one menu is displayed in a form of a list.

In an exemplary embodiment, the act that the visual data is displayed as the visual menu may include the following act. It is determined to display all menus or display a part of menus according to a screen size of a device displaying the visual menu.

In an exemplary embodiment, after the visual data is displayed as the visual menu, the call processing method may further include the following acts. The visual menu is saved and a relationship between the visual menu and a number is established. In the present embodiment, the relationship may be used for invoking the visual menu when a user dials the number.

According to an embodiment of the present disclosure, there is also provided a call processing device including a converting module and a displaying module. The converting module is arranged to convert voice guidance in a call into a visual data. The displaying module is arranged to display the visual data as a visual menu to present content of the voice guidance.

In an exemplary embodiment, the converting module may include an acquiring unit and a converting unit. The acquiring unit is arranged to acquire indication information. In the present embodiment, the indication information indicates whether to convert the voice guidance into the visual data. The converting unit is arranged to convert the voice guidance into the visual data when the indication information indicates to convert the voice guidance into the visual data.

In an exemplary embodiment, the call processing device may further include a first receiving module. The first receiving module is arranged to receive data input by a user during a voice guidance interaction process and save the data after the displaying module displays the visual data as the visual menu.

In an exemplary embodiment, the call processing device may further include an invoking module. The invoking module is arranged to invoke the data and display the data together with the visual menu after saving the data input by the user.

In an exemplary embodiment, the call processing device may further include a second receiving module and a sending module. The second receiving module is arranged to receive a command through the visual menu after the displaying module displays the visual data as the visual menu. The sending module is arranged to send the command to a provider of the voice guidance.

In an exemplary embodiment, the displaying module may include at least one of a first displaying unit, a second displaying unit, a third displaying unit and a fourth displaying unit. The first displaying unit is arranged to display the visual data as the visual menu in a form of a list. The second displaying unit is arranged to display the visual data as the visual menu in a form of a tree structure. The third displaying unit is arranged to display the visual data as the visual menu in a form of organization architecture. The fourth displaying unit is arranged to display the visual data as the visual menu in a form of text display.

In an exemplary embodiment, each of the first displaying unit, the second displaying unit and the third displaying unit may include a first-level menu sub-unit and a next-level menu sub-unit. The first-level menu sub-unit is arranged to display one or more first-level menus. The next-level menu sub-unit is arranged to display, after receiving a command of displaying a next-level menu of at least one menu in the one or more first-level menus, the next-level menu of the at least one menu in a form of a list.

In an exemplary embodiment, the displaying module may include an adjusting unit. The adjusting unit is arranged to determine to display all menus or display a part of menus according to a screen size of a device displaying the visual menu.

In an exemplary embodiment, the call processing device may further include a saving module. The saving module is arranged to save the visual menu and establish a relationship between the visual menu and a number corresponding to the voice guidance after the displaying module displays the visual data as the visual menu. In the present embodiment, the relationship may be used for invoking the visual menu when a user dials the number.

According to the technical scheme provided by the embodiments of the present disclosure, voice guidance in a call is converted into visual data, and the visual data is displayed as a visual menu to present content of the voice guidance, so as to solve the problem of poor user experience caused by the voice guidance employed in a call. By virtue of the technical scheme, the voice guidance is displayed as a visual menu vividly and intuitively, thereby improving user experience.

BRIEF DESCRIPTION OF THE DRAWINGS

The drawings are described here to provide further understanding of the present disclosure, and form a part of the present application. In the drawings.

DETAILED DESCRIPTION OF THE EMBODIMENTS

It is to be noted that the embodiments in the present application and the characteristics in the embodiments may be combined with each other under the condition of no conflicts. The present disclosure is described below with reference to the drawings and the embodiments in detail.

The acts shown in the flow diagrams of the accompanying drawing may be performed in a user terminal, for example, a smart phone or a tablet computer. Although the logical sequence is shown in the flow diagrams, in some cases, the acts shown or described may be performed in an order different from the order herein.

The "first" and "second" in the following embodiments are only for distinguishing and do not define the order.

Figure 1:
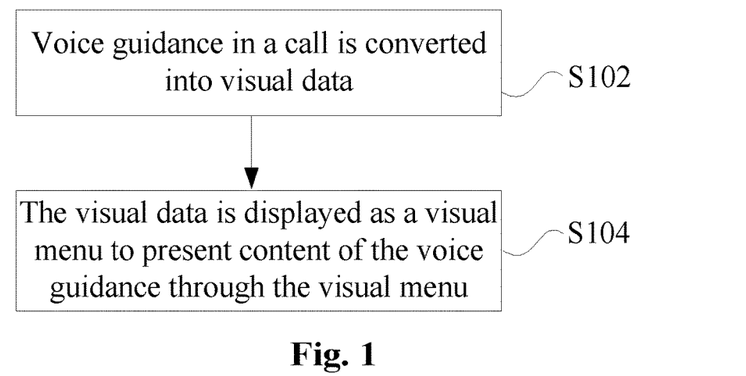
FIG. 1 is a flow diagram of a call processing method according to an embodiment of the present disclosure.

The present embodiment provides a call processing method. FIG. 1 is a flow diagram of a call processing method according to an embodiment of the present disclosure. As shown in FIG. 1, the flow may include the following acts S102 and S104.

At act S102, voice guidance in a call is converted into visual data.

At act S104, the visual data is displayed as a visual menu to present content of the voice guidance through the visual menu.

Through each of the above acts, voice guidance in a call is converted into visual data, and the visual data is displayed as a visual menu to present content of the voice guidance, so as to solve the problem of poor user experience caused by the voice guidance employed in a call. By virtue of the technical scheme, the voice guidance can be displayed as a visual menu vividly and intuitively. When the voice broadcast is given at an over slow voice speed, the user may carelessly miss the content that the user is interested in. Through the above acts, the voice guidance may be recognized according to the voice call, providing a visual interactive function, so that a user can select the service that the user needs from the visual menu without needing to listen to the voice guidance, thereby preventing the user from missing the content that the user is interested in, and improving the user experience.

Figure 2:
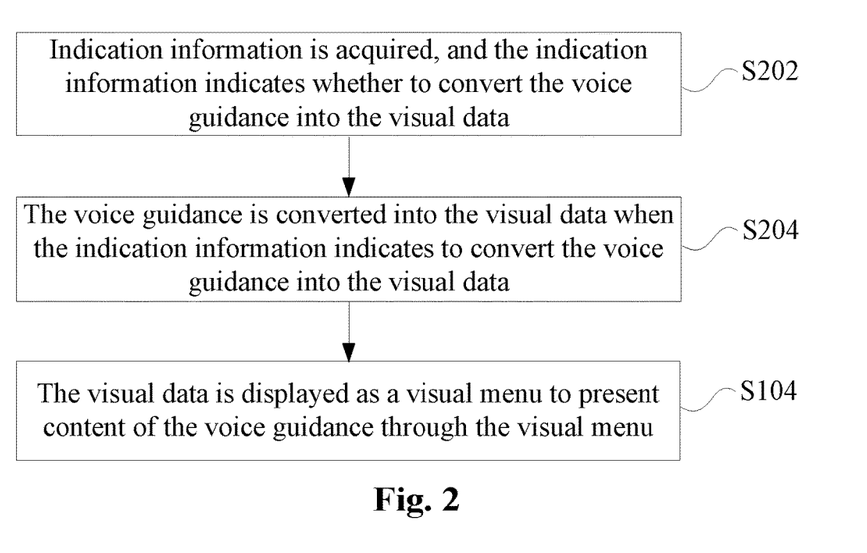
FIG. 2 is a first exemplary flow diagram of a call processing method according to an embodiment of the present disclosure.

FIG. 2 is a first exemplary flow diagram of a call processing method according to an embodiment of the present disclosure. As shown in FIG. 2, in an exemplary embodiment, the process of converting the voice guidance into visual data in act S102 may include the following acts S202 and S204.

At act S202, indication information is acquired. The indication information indicates whether to convert the voice guidance into the visual data.

At act S204, the voice guidance is converted into the visual data when the indication information indicates to convert the voice guidance into the visual data.

Through the above acts, the switch function may be achieved through the indication information. For example, a switch may be configured so that the visual menu interface does not affect the original dialling interface. Meanwhile, the user may select to open the visual menu or may select to close the visual menu and conduct a call in a conventional voice manner. When making a call, whether visual voice response is supported may be checked, if the visual voice response is supported, a visual dialling interface may be initiated.

In the above exemplary embodiment, by executing each of the above acts, the indication information may be acquired according to the selection of the user, and whether to convert the voice guidance into the visual data may be determined according to the indication information. In this way, the user can select the visual menu or the conventional voice broadcast, thereby improving the user experience.

In some cases, when dialling the same hotline, the users may want to consult or inquire about the same service. In an exemplary embodiment of the present disclosure, after the visual data is displayed as the visual menu, data input by the user during a voice guidance interaction process may be received and the data input by the user may be saved.

These data may be placed in one file or in different files. For example, bank account information and other sensitive information may need to be stored in a separate file. According to the call processing method in the present embodiment, when the user dials the same hotline the next time, if the same service needs to be consulted or inquired, the stored data may be invoked, so that the user does not need to input the information again, thereby improving the user experience.

In an exemplary embodiment of the present disclosure, after the data input by the user is saved, the data may be invoked and the data may be displayed together with the visual menu, so that the data that the user may need to invoke may be visually displayed, and the user does not need to manually invoke the data, thereby improving the user experience.

Figure 3:
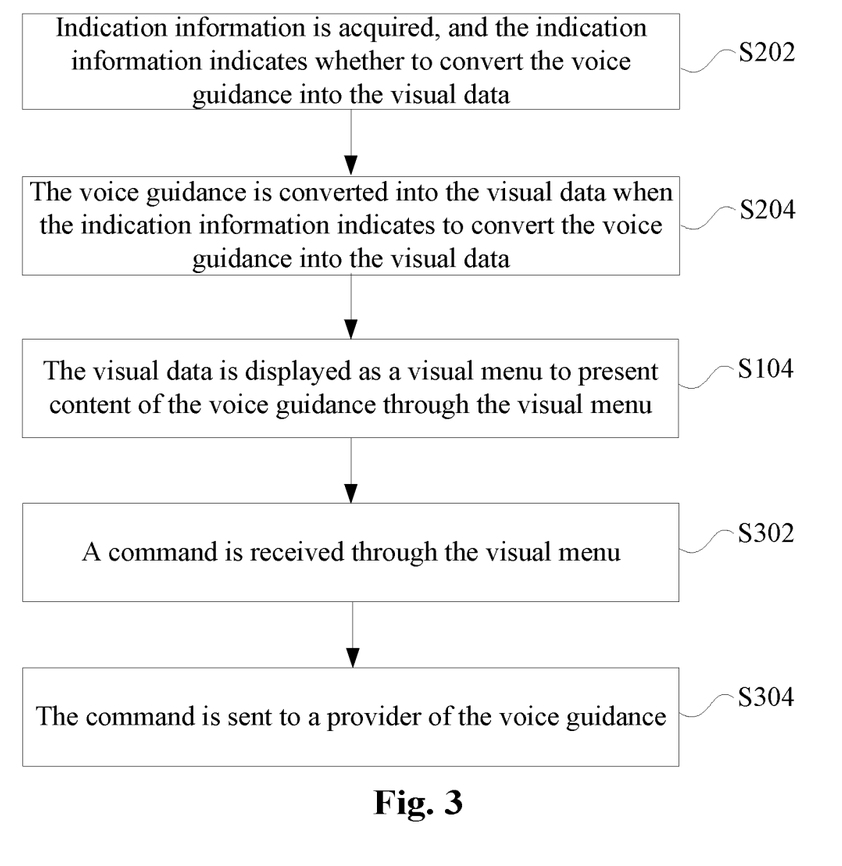
FIG. 3 is a second exemplary flow diagram of a call processing method according to an embodiment of the present disclosure.

FIG. 3 is a second exemplary flow diagram of a call processing method according to an embodiment of the present disclosure. In an exemplary embodiment of the present disclosure, after the visual data is displayed as the visual menu, that is, after act S104, as shown in FIG. 3, the flow may include the following acts S302 and S304.

At act S302, a command is received through the visual menu.

At act S304, the command is sent to a provider of the voice guidance.

By executing each of the above acts, the user can conveniently and intuitively interact with the service provider through the visual menu. In response to the key pressing and/or touching events of the user, the corresponding functions are executed according to the data command. When traditional voice broadcast is adopted, a mobile phone often shuts down the screen in the process of dialling in order to save energy, or the mobile phone may need to be moved from the ear to the user's face when the user needs to input some content. By virtue of the technical scheme, such inconvenience can be avoided, thereby improving the user experience.

In addition, during practical implementation, there may be many implementation options for displaying the visual data as the visual menu. In an exemplary embodiment, the implementation may include at least one of: displaying the visual data as the visual menu in a form of a list, displaying the visual data as the visual menu in a form of a tree structure, displaying the visual data as the visual menu in a form of organization architecture, and displaying the visual data as the visual menu in a form of text display.

Herein, displaying the visual data as the visual menu in a form of a list has the following characteristics. The menu may be displayed one level by one level. For example, one or more first-level menu items may be first displayed in a form of a list, after the user selects a menu, each sub-menu corresponding to the selected menu is then displayed in a form of a list. The user may also return to the previous menu by a return button.

Displaying the visual data as the visual menu in a form of a tree structure has the following characteristics. After clicking on a node menu on a tree diagram, if there is a sub-menu subordinate to this node menu, after the user selects a node menu, each sub-node menu subordinate to this selected node menu is expanded and displayed. The user may also jump directly from one menu to another menu.

Displaying the visual data as the visual menu in a form of organization architecture has the following characteristics. After clicking on a node menu on the organization architecture, if there is a sub-menu subordinate to this node menu, each sub-node menu subordinate to this selected node menu is expanded and displayed. The user may also jump directly from one menu to another menu.

By adopting the call processing method in the above embodiments, the user can select a plurality of implementations of the visual menu so that the presentation form of the visual menu is diversified. In addition, the user may easily switch and select between different menus, thereby improving the user experience.

Due to the diversification of user terminals, the display screen may have different sizes. For the screen of different sizes, in an exemplary embodiment of the present disclosure, it may be determined to display all menus or display a part of menus according to a screen size of the device, so as to give the user a satisfactory visual experience. By virtue of the technical scheme, the visual menu may be displayed at a proper size to facilitate the identification and selection, thereby improving the user experience.

In an exemplary embodiment of the present disclosure, after the visual data is displayed as the visual menu, the visual menu may be saved and a relationship between the visual menu and a number may be established. By virtue of the technical scheme, when the user dials a number, the user can invoke the visual menu according to the corresponding relationship between the stored number and the visual menu, thereby saving time of the user and improving the user experience.

For example, when the user dials the hotline again under a condition that the visual menu data has been stored, the stored visual menu data is invoked according to the hotline number input by the user, and the voice prompt coming from the opposite terminal is monitored to determine whether the currently played voice menu has been stored. If the currently played voice menu has been stored, the stored visual menu data is displayed level by level according to the menu order in which the voice is played. If the currently played voice menu has not been stored, the audio information played in the call in converted into e.g. text. The visual menu is displayed to the user and stored.

According to the above embodiments and exemplary embodiments, the terminal performs speech recognition on the voice guidance based on the speech recognition technology to form a visual menu. The visual menu may be stored in the terminal after being generated. The content of the voice guidance may be presented in a form of a list, in a form of a tree structure, in a form of organization architecture, or in other intuitive manners so as to achieve visualization of the menu and receive the user input. The user input content may be stored for facilitating operations in repeated dialling.

In the embodiment, there is also provided a device which corresponds to the call processing method in the above embodiment. Those which have been described will not be repeated herein. The modules or units in the call processing device may be codes stored in a memory or a user terminal and may be run by a processor, or may be implemented in other manners, which will not be illustrated with examples.

Figure 4:
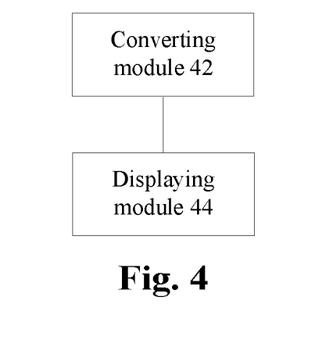
FIG. 4 is a structure block diagram of a call processing device according to an embodiment of the present disclosure.

According to an embodiment of the present disclosure, there is also provided a call processing device. FIG. 4 is a structure block diagram of a call processing device according to an embodiment of the present disclosure. As shown in FIG. 4, the call processing device may include a converting module 42 and a displaying module 44.

The converting module 42 is arranged to convert voice guidance in a call into a visual data.

The displaying module 44 is arranged to display the visual data as a visible menu to present content of the voice guidance.

Through each of the above modules, the converting module 42 converts voice guidance into a visual data, and the displaying module 44 displays the visual data as a visible menu to present content of the voice guidance, so as to solve the problem of poor user experience caused by the voice guidance employed in a call. By virtue of the technical scheme, the voice guidance can be displayed as a visual menu vividly and intuitively. When the voice broadcast is given at an over slow voice speed, the user may carelessly miss the content that the user is interested in. By virtue of the technical scheme provided above, the user can select the service that the user needs from the visual menu, thereby preventing the user from missing the content that the user is interested in, and improving the user experience.

The converting module 42 may be implemented in a variety of ways. In an exemplary embodiment, the converting module 42 may include an acquiring unit and a converting unit.

The acquiring unit is arranged to acquire indication information. The indication information indicates whether to convert the voice guidance into the visual data.

The converting unit is arranged to convert the voice guidance into the visual data when the indication information indicates to convert the voice guidance into the visual data.

Through each of the above units, the switch function may be achieved through the acquiring unit. For example, a switch may be configured so that the visual menu interface does not affect the original dialling interface. Meanwhile, the user may select to open the visual menu or may select to close the visual menu and conduct a call in a conventional voice manner. When making a call, whether visual voice response is supported may be checked, if the visual voice response is supported, a visual dialling interface may be initiated.

In general, the converting unit may include a caching portion, a sound decoding portion, and a character library portion. The caching portion caches the audio segments in the voice prompt currently being played by the voice guidance provider. The character library portion is generally provided separately in the terminal. The sound decoding portion decodes and identifies the cached audio information and searches for a matched character based on the character library.

In the above exemplary embodiment, by executing each of the above units, the acquiring unit can acquire the indication information according to the selection of the user, and the converting unit converts the voice guidance into the visual data. In such a way, the user can select the visual menu or the conventional voice broadcast menu, thereby improving the user experience.

In some cases, when dialling the same hotline, the users may want to consult or inquire about the same service. In an exemplary embodiment of the present disclosure, the call processing device may further include a first receiving module arranged to, after the displaying module displays the visual data as the visual menu, receive data input by the user during a voice guidance interaction process and save the data.

These data may be placed in one file or in different files. For example, bank account information and other sensitive information may need to be stored in a separate file. When the user dials the same hotline the next time, if the same service needs to be consulted or inquired, the data stored by the first receiving module may be invoked, so that the user does not need to input the information again, thereby improving the user experience.

In an exemplary embodiment of the present disclosure, the call processing device may further include an invoking module arranged to, after the data input by the user is saved, invoke the data and display the data together with the visual menu, so that the data that the user may need to invoke may be visually displayed, and the user does not need to manually invoke the data, thereby improving the user experience.

Figure 5:
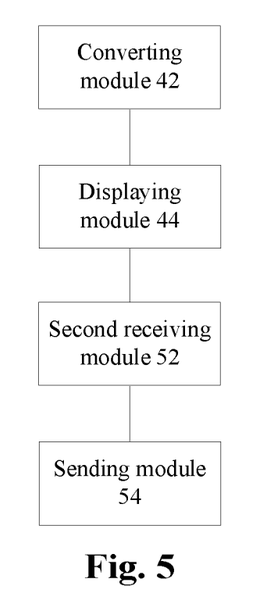
FIG. 5 is a first exemplary structure block diagram of a call processing device according to an embodiment of the present disclosure.

FIG. 5 is a first exemplary structure block diagram of a call processing device according to an embodiment of the present disclosure. In an exemplary embodiment of the present disclosure, after the displaying module displays the visual data as the visual menu, as shown in FIG. 5, the call processing device may further include a second receiving module 52 and a sending module 54.

The second receiving module 52 is arranged to receive a command through the visual menu.

The sending module 54 is arranged to send the command to a provider of the voice guidance.

The second receiving module 52 completes the acquisition of the user key pressing and acquires the user command according to the specific key information corresponding to the menu selected by the user. The sending module 54 transmits the command to the provider of the voice guidance. By executing each of the above modules, the user can conveniently and intuitively interact with the provider of the voice guidance through the second receiving module 52 and the sending module 54. When traditional voice broadcast is adopted, a mobile phone often shuts down the screen in the process of dialling in order to save energy, or the mobile phone may need to be moved from the ear to the user's face when the user needs to input some content. By virtue of the technical scheme, such inconvenience can be avoided, thereby improving the user experience.

In addition, during practical implementation, there may be many implementation options for the displaying module 44. The displaying module 44 identifies the acquired text information from the converting module 42, graphically presents the voice guidance information, and displays the corresponding UI interface on the screen; achieves the graphic presentation of the voice guidance information and the presentation of the text information. The displaying module 44 also determines the logic rule of the information presentation, such as in the form of the list, in the form of the tree structure, or in the form of the organization architecture. In an exemplary embodiment, the displaying module 44 may include at least one of a first displaying unit, a second displaying unit, a third displaying unit and a fourth displaying unit.

The first displaying unit is arranged to display the visual data as the visual menu in a form of a list.

The second displaying unit is arranged to display the visual data as the visual menu in a form of a tree structure.

The third displaying unit is arranged to display the visual data as the visual menu in a form of organization architecture.

The fourth displaying unit is arranged to display the visual data as the visual menu in a form of text display.

Herein, the first displaying unit has the following characteristics. The menu may be displayed one level by one level. For example, one or more first-level menu items may be first displayed in a form of a list, and after the user selects a menu, each sub-menu corresponding to the selected menu is then displayed in a form of a list. The user may also return to the previous menu by a return button.

The second displaying unit has the following characteristics. After clicking on a node menu on a tree diagram, if there is a sub-menu subordinate to this node menu, after the user selects a node menu, each sub-node menu subordinate to this selected node menu is expanded and displayed. The user may also jump directly from one menu to another menu.

The third displaying unit has the following characteristics. After clicking on a node menu on the organization architecture, if there is a sub-menu subordinate to this node menu, each sub-node menu subordinate to this selected node menu is expanded and displayed. The user may also jump directly from one menu to another menu.

Through the above embodiments, the user can select a plurality of implementations of the displaying module 44 so that the presentation form of the visual menu is diversified. In addition, the user may easily switch and select between different menus, thereby improving the user experience.

Due to the diversification of user terminals, the display screen may have different sizes. For the screen of different sizes, in an exemplary embodiment of the present disclosure, the displaying module 44 may further include an adjusting unit arranged to determine to display all menus or display a part of menus according to a screen size of the device, so as to give the user a satisfactory visual experience. By virtue of the technical scheme, the visual menu may be displayed at a proper size to facilitate the identification and selection, thereby improving the user experience.

In an exemplary embodiment of the present disclosure, the call processing device may further include a saving module arranged to save the visual menu and establish a relationship between the visual menu and a number after the displaying module displays the visual data as the visual menu. By virtue of the technical scheme, when the user dials a number, the user can invoke the visual menu according to the corresponding relationship between the stored number and the visual menu, thereby saving time of the user and improving the user experience.

For example, the saving module can complete the dialling number registration, voice menu information storage, and user input content storage. The saving module identifies the visual menu from the displaying module 44 and stores the visual menu locally, keeps storing the latest voice menu information, and completes the storage of a batch of hotline related information. The stored hotline related information may include, for example, the hotline name, the number, the related visual menu information, user input information and so on.

The technical scheme will be described below in connection with an exemplary embodiment of the present disclosure, taking a user terminal as an example.

After dialling a hotline, a user generally hears the greeting first. The user may select the business or service he/she wishes to proceed after listening to the voice broadcast. In general, the user may only select the business or service that the user wishes to proceed after listening to the voice broadcast. As the voice broadcast is given progressively, the user has to listen to voice broadcast one level by one level before he/she can select the business or service that he/she wishes to proceed, resulting in lower efficiency. It also influences the perception of the user for the corporate image, and the input of some complicated personal information is also tedious.

In this exemplary embodiment, a technical scheme enabling visualization of the voice menu when a user dials the hotline is provided, taking the present popular intelligent terminal as an example. The text interactive means may be introduced when the user dials the hotline so that the hotline dialling becomes more intelligent and humanized.

The present exemplary embodiment provides a visual dialling method for a terminal device. A visual interactive menu is provided to a user in a telephone call to facilitate the user to select the service to be handled and to present content of the voice guidance graphically. The user achieves the self-service by selecting the corresponding service menu item, that is, achieves the voice guidance through the visual menu, without the need to select the service by listening to the voice guidance. According to the data command, in response to the key pressing and/or touching events of the user, the corresponding functions may be completed after the service phone menu data is loaded in the visual dialling interface.

The manner of displaying the voice guidance may be a paragraph of ordinary texts, or the voice guidance may be displayed in a form of a list, or in a form of a tree structure, or in a form of organization architecture. Whether the menu is displayed level by level or all or a part of menus are displayed once may be determined according to a screen size of the device displaying the visual menu. According to different organization forms of the menu items, the user may switch and select between the different menus when selecting the menu.

The three manners will be explained below.

The list manner has the following characteristics. The menu is displayed one level by one level. One or more first-level menu items may be first displayed in a form of a list, and after the user selects a menu each sub-menu corresponding to the selected menu is then displayed in a form of a list. The tree structure manner has the following characteristics. The menu item is presented in the tree diagram manner, after clicking on a node menu on a tree diagram, if there is a sub-menu subordinate to this node menu, after the user selects a node menu, each sub-node menu subordinate to this selected node menu is expanded and displayed. The organization architecture manner has the following characteristics. the menu item is presented in the organization architecture manner, after clicking on a node menu on the organization architecture, if there is a sub-menu subordinate to this node menu, each sub-node menu subordinate to this selected node menu is expanded and displayed. For the menu organized in a form of a list, the user may return to the previous menu by a return button. For the menu organized in a form of a tree structure or in a form of organization architecture, the user may jump directly from one menu to another menu.

In the present embodiment, a switch may be configured so that the visual dialling interface does not affect the original dialling interface. The user may select to open the visual menu or may select to close the visual menu and conduct a call in a conventional voice manner. When making a call, whether visual voice response is supported may be checked, if the visual voice response is supported, a visual dialling interface may be initiated.

As an exemplary embodiment, the user may save the input content data in this call. These data may be placed in one file or in different files. For example, bank account information and other sensitive information may need to be stored in a separate file. The data may be stored in the terminal memory together with the visual menu and may be invoked and displayed together with the visual menu.

As an exemplary embodiment, the menu data of the service telephone in the present embodiment may include menu data and user data. This will be described below respectively.

Menu data: the user may be connected to different services or other interfaces by selecting different service commands, including returning to the previous layer, transferring to the manual service, timeout length, timeout action, returning to the previous menu after timeout, requiring re-input after timeout, repeating (refreshing) and so on. As the telephone service changes, the number and format of the command may be modified accordingly.

User data: user data includes common input information and sensitive input information, such as bank account information, password information and so on.

When the user dials the hotline again under a condition that the visual menu data has been stored, the calling unit invokes the visual menu data stored by the speech recognition unit according to the hotline number input by the user, and the speech recognition unit monitors the voice prompt coming from the opposite terminal to determine whether the currently played voice menu has been stored. If the currently played voice menu has been stored, the stored visual menu data is displayed level by level according to the menu order in which the voice is played. If the currently played voice menu has not been stored, the audio information played in the call in converted into e.g. text by the speech recognition unit. The visual menu unit is displayed to the user and stored.

In the present exemplary embodiment, a visual voice dialling device is provided for a terminal device, including a speech recognition unit (achieving the function of the above converting module 42), a visual menu unit (achieving the function of the displaying module 44), and a calling unit. These units will be described below respectively.

Speech Recognition Unit

The speech recognition unit monitors the voice prompt coming from the opposite terminal and returns the menu recognition result. The speech recognition unit converts the audio information played in the call into text. The speech recognition unit is coupled with the visual menu unit for displaying the text information to the user, that is, the relevant text information is transmitted to the visual menu unit to be displayed to the user in a certain interface form.

The speech recognition unit may include a caching module and a converting module. The caching module is arranged to cache the audio segments in the voice prompt currently being played by the opposite terminal and to be triggered after the call is started. The converting module is coupled with the caching module, and is arranged to convert the current cached audio segments into text information when the voice prompt ends. The converting module may include a sound decoding portion and a character library portion. The library portion is generally arranged separately in the mobile phone memory. The sound decoding portion decodes and identifies the audio information cached by the mobile phone terminal and searches for a matched character based on the character library pre-stored in the mobile phone, and sends the matched character as a search keyword to the searching module.

The cached audio information is converted into character information by the speech recognition function. That is, the voice information sent by the opposite terminal is acquired, for example, the content "said" by the opposite terminal. Then, the voice information coming from the opposite terminal is converted into character information for display through the speech recognition technology. An existing Automated Speech Recognition (ASR) can convert the vocabulary content in a human voice into a computer-readable input, for example, and the conversion may be achieved by the following three acts:

1, performing feature extraction on the input voice;

2, matching the extracted voice signal and the voice model within the computer; and 3, outputting the matching result.

Since the speech recognition technology is a traditional art, it will not be repeated herein.

Calling Unit

The unit is a function module of making a call, including a normal telephone function and a visual dialling function of automatic voice answering phones. The calling unit may be implemented by existing technologies and is not a key point of the present disclosure. An interface between the calling unit and the visual menu unit is provided.

Visual Menu Unit

The unit identifies the acquired text information from the speech recognition unit, graphically presents the voice guidance information, presents the corresponding menu through the visual menu, and displays the corresponding UI interface on the screen. The unit also provides the interface for user input, waits for the user operation, completes the acquisition of the user key pressing, acquires the corresponding key information according to the specific menu selected by the user, and passes the key information to the calling unit. The unit also achieves graphic presentation of the voice guidance and the presentation of the text information, determines the logic rule of the information presentation in the form of the list, in the form of the tree structure, or in the form of the organization architecture.

The visual menu unit provides the storage function, completes the dialling number registration, the voice menu information storage, and the user input content storage. The visual menu unit identifies the visual menu from the speech recognition unit and stores the visual menu locally, and stores the latest voice menu information. The visual menu unit also completes the storage of a batch of hotline related information. The stored information may include, for example, the hotline name, the number, the related visual menu information, user input information and so on.

The voice menu information may further include a hotline number, a menu level, a menu name, a menu number, and so on. It is assumed that the voice self-service menu logic of 10086 is as follows: pressing 10086 to enter first-level menu nodes, with the following voice prompts: "press 1 for balance query, and press 2 to talk to our representative".

Figure 6:
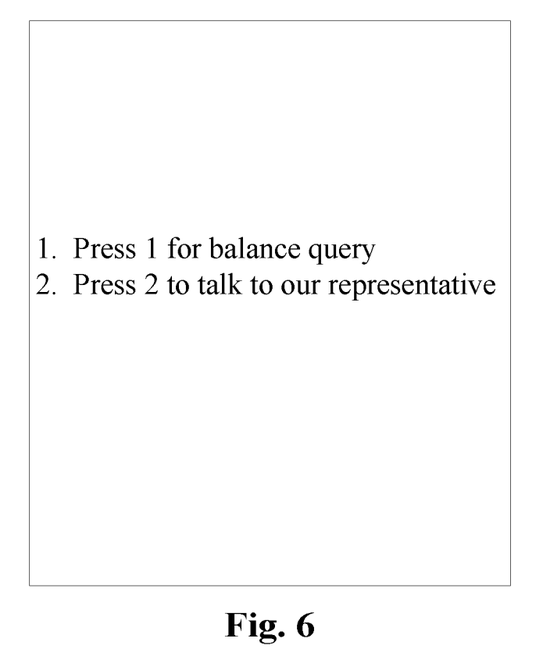
FIG. 6 is a schematic diagram of a visual menu of a call processing device according to an embodiment of the present disclosure.

FIG. 6 is a schematic diagram of a visual menu of a call processing device according to an embodiment of the present disclosure. As shown in FIG. 6, it is assumed that the voice self-service menu logic of 10086 is as follows: dialling 10086 for a first-level menu node, with the following voice prompts: "press 1 for balance query, and press 2 to talk to our representative". The converting module 44 (embodied as a speech recognition unit, the following description is based on the speech recognition unit) converts the voice prompts into character menu to be displayed to the user.

Figure 7:
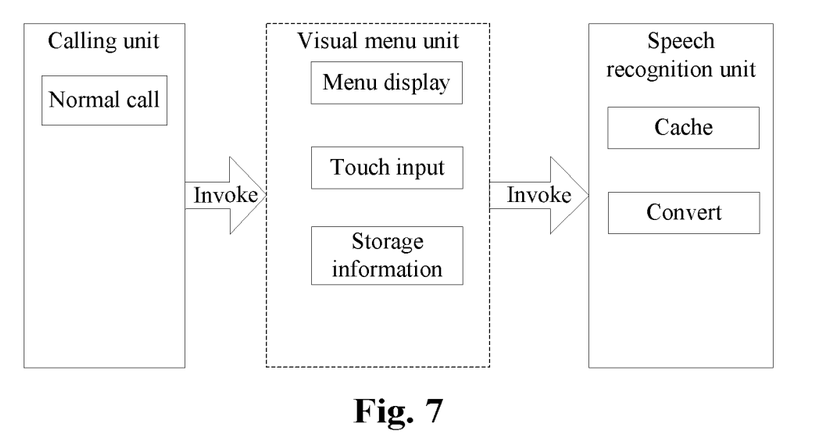
FIG. 7 is a schematic diagram of a call processing device for storing user input data according to an embodiment of the present disclosure.

In the visual menu dialling process, when the user has selected a menu to call, the specific methods may be different depending on different operating systems. FIG. 7 is a schematic diagram of a voice dialling structure of a call processing device according to an embodiment of the present disclosure. In the present exemplary embodiment, as shown in FIG. 7, the visual menu unit (the visual menu unit realizes the function of the above displaying module 44, the second receiving module 52, the sending module 54, and the storing module) in the Android system receives the user touch operation, and passes different parameters when the user clicks the execution menu. For example, when the user clicks on the menu of "press 1 for balance query", the visual menu unit converts the touch instruction to the numeric information corresponding to the menu button and passes the numeric information to the calling unit. It is assumed that the visual menu is a two level structure, and the menu logic of the service of 10086 is as follows. The number 10086 is dialled to enter the first-level menu. The visual menu is as follows: "press 1 for balance query and press 2 to talk to our representative". When the user clicks on menu 1, the account balance is sent to the user, and when the user clicks on menu 2, the user is accessed to manual service.

In the visual menu dialling process, when the user wishes to jump directly from the third-level menu to the first-level menu, the user only needs to click on the first-level menu on the screen, and the visual menu unit automatically passes a voice command of returning to the previous-level to the calling unit to complete the operation of returning to the previous-level menu. It is assumed that the voice self-service menu logic of 10086 is to press 0 to return to the previous-level menu. When the user clicks and selects to directly jump from the third-level menu interface to the first-level menu interface, the visual menu unit receives the user input and continuously feeds two 0 back to the calling unit. A direct page jump is displayed to the user on the UI interface. The calling unit continuously completes the input of two return keys in the background actually. When the user wishes to jump directly from the first-level menu to the third-level menu, the user only needs to select the third-level menu by clicking the third-level menu on the screen by touching, and the visual menu unit automatically passes the voice command of the second-level menu number corresponding to the third-level menu number to the calling unit to complete the operation of going to the third-level menu. It is assumed that the third-level menu number of the voice self-service of 10086 is 1-1-1. When the user selects on the first-level menu interface to go to the third-level menu interface to perform further clicking and selection by touching, the visual menu unit receives the user input and continuously feeds two 1 back to the calling unit. A direct page jump is displayed to the user on the UI interface. The calling unit continuously completes the input of two 1 keys in the background actually.

Figure 8:
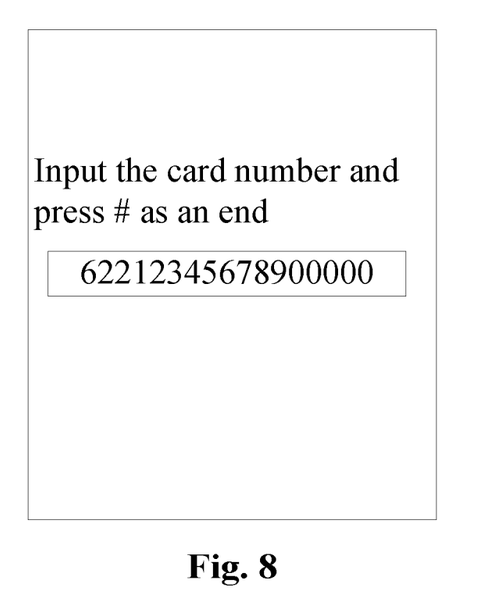
FIG. 8 is a third flow diagram of a call processing method according to an exemplary embodiment of the present disclosure.

The user may also select the menu that the user needs in a manner of pressing the key or touching. The input content information of the user may include a touch operation on the menu, a corresponding user input text content, and so on. FIG. 8 is a schematic diagram of a call processing device for storing user input data according to an embodiment of the present disclosure. As shown in FIG. 8, when a user inputs a string of text information, for example, a bank card number, the visual menu unit may store the number, and the number is filled in the visual menu by default when dialling the next time without the need of the re-input of the user.

Figure 9:
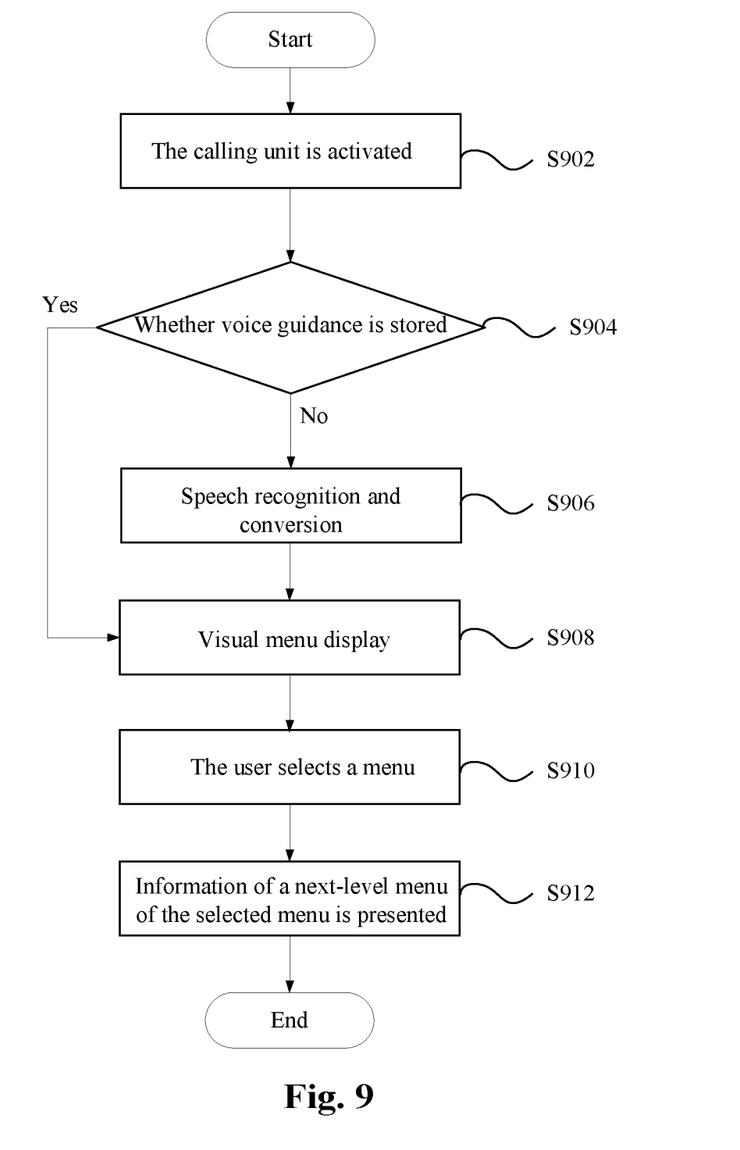
FIG. 9 is a fourth flow diagram of a call processing method according to an exemplary embodiment of the present disclosure.

FIG. 9 is a third flow diagram of a call processing method according to an exemplary embodiment of the present disclosure. In a second exemplary embodiment of the present disclosure, as shown in FIG. 9, the flow may include the following acts.

At act S902, the calling unit is activated, and the hotline number to be dialled is selected.

At act S904, the visual menu unit determines whether the latest voice guidance is stored according to the hotline to be dialled, if so, the menu is displayed level by level and the user input is received, and if not, act S906 is executed to start the speech recognition unit.

At act S906, the speech recognition unit caches the audio information of the current call, identifies the information and converts the information into text information.

At act S908, the visual menu unit presents the current menu information according to the recognition result and the graphic menu display requirement (the list manner, the tree diagram manner, or the organization architecture manner).

At act S910, the user selects a menu by clicking, and the visual menu unit converts the click of the user on the menu into the menu number and sends the menu number to the calling unit.

At act S912, the calling unit notifies the visual menu unit to further present information of a next-level menu of the selected menu after receiving the feedback.

Through each of the above acts, the voice broadcast may be converted into a visual menu, thereby facilitating user operation, saving time of the user, and improving user experience.

Figure 10:
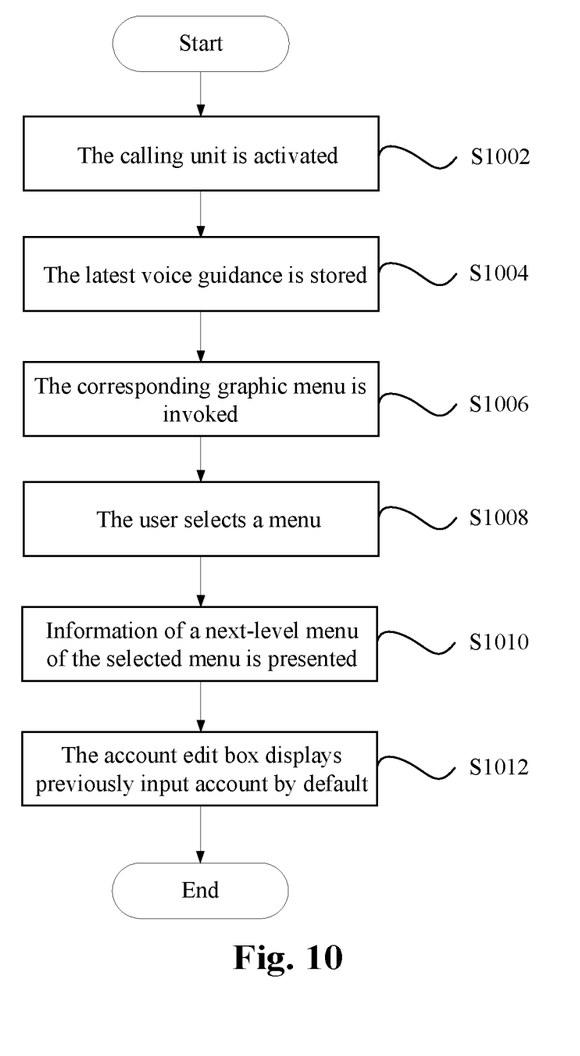
FIG. 10 is a fifth flow diagram of a call processing method according to an exemplary embodiment of the present disclosure.

In a third exemplary embodiment, FIG. 10 is a fifth flow diagram of a call processing method according to an exemplary embodiment of the present disclosure. As shown in FIG. 10, the flow may include the following acts.

At act S1002, the calling unit is activated, and the hotline number to be dialled is selected.

At act S1004, the visual menu unit determines that the latest voice guidance is stored according to the hotline to be dialled.

At act S1006, the visual menu unit invokes the corresponding graphic menu according to the speech recognition result, and displays the stored menu information level by level.

At act S1008, the user selects a menu by clicking, and the visual menu unit converts the click of the user on the menu into the menu number and sends the menu number to the calling unit.

At act S1010, the calling unit notifies the visual menu unit to further present information of a next-level menu of the selected menu after receiving the feedback.

At act S1012: When the menu information needs input of account information, the visual menu unit displays a menu edit box and inputs the user input content stored in the last call by default, and the user can directly use the previously stored content or re-enter a new account.

Through each of the above acts, the voice broadcast may be converted into a visual menu, thereby facilitating user operation, saving time of the user, and improving user experience.

In another embodiment, there is also provided a software for performing the technical solutions described in the above embodiments and exemplary embodiments.

In another embodiment, there is also provided a storage medium in which the above software is stored, including but not limited to optical disks, floppy disks, hard disks, erasable memories, and so on.

The above is only an exemplary embodiment of the present disclosure and not intended to limit the present disclosure, and for the technician of the field, the present disclosure may have various modifications and variations. Any modifications, equivalent replacements, improvements and so on within the principle of the present disclosure shall fall within the scope of protection as defined in the appended claims of the present disclosure.

INDUSTRIAL APPLICABILITY

In above technical solution provided according to the embodiments of the present disclosure, voice guidance in a call is converted into visual data; and the visual data is displayed as a visual menu to present content of the voice guidance, so as to solve the problem of poor user experience caused by the voice guidance employed in a call. By virtue of the technical scheme, the voice guidance is displayed as a visual menu vividly and intuitively, thereby improving user experience.

What is claimed is:

1. A call processing method, comprising:
    converting voice guidance in a call into visual data; and
    displaying the visual data as a visual menu to present content of the voice guidance;
    wherein converting the voice guidance into the visual data comprises:
    acquiring indication information, wherein the indication information indicates whether to convert the voice guidance into the visual data; and
    converting the voice guidance into the visual data when the indication information indicates to convert the voice guidance into the visual data.

2. The call processing method as claimed in claim 1, wherein after displaying the visual data as the visual menu, the call processing method further comprises:
    receiving data input by a user during a voice guidance interaction process and saving the data input by the user.

3. The call processing method as claimed in claim 2, wherein after saving the data input by the user, the call processing method further comprises:
    invoking the data and displaying the data together with the visual menu.

4. The call processing method as claimed in claim 1, wherein after displaying the visual data as the visual menu, the call processing method further comprises:
    receiving a command through the visual menu; and
    sending the command to a provider of the voice guidance.

5. The call processing method as claimed in claim 1, wherein displaying the visual data as the visual menu comprises at least one of:
    displaying the visual data as the visual menu in a form of a list, displaying the visual data as the visual menu in a form of a tree structure, displaying the visual data as the visual menu in a form of organization architecture, or displaying the visual data as the visual menu in a form of text display.

6. The call processing method as claimed in claim 5, wherein when the visual data is displayed in the form of the list, in the form of the tree structure, or in the form of the organization architecture, displaying the visual data as the visual menu comprises:
    displaying one or more first-level menus; and
    displaying, after receiving a command of displaying a next-level menu of at least one menu in the one or more first-level menus, the next-level menu of the at least one menu in a form of a list.

7. The call processing method as claimed in claim 1, wherein displaying the visual data as the visual menu comprises:
    determining to display all menus or display a part of menus according to a screen size of a device displaying the visual menu.

8. The call processing method as claimed in claim 1, wherein after displaying the visual data as the visual menu, the call processing method further comprises:
    saving the visual menu and establishing a relationship between the visual menu and a number, wherein the relationship is used for invoking the visual menu when a user dials the number.

9. A call processing device, comprising a hardware processor arranged to execute program modules comprising:
    a converting module, arranged to convert voice guidance in a call into a visual data; and
    a displaying module, arranged to display the visual data as a visual menu to present content of the voice guidance;
    wherein the converting module comprises: an acquiring unit, arranged to acquire indication information, wherein the indication information indicates whether to convert the voice guidance into the visual data; and a converting unit, arranged to convert the voice guidance into the visual data when the indication information indicates to convert the voice guidance into the visual data.

10. The call processing device as claimed in claim 9, wherein the hardware processor is arranged to execute program modules comprising:
    a first receiving module, arranged to, after the displaying module displays the visual data as the visual menu, receive data input by a user during a voice guidance interaction process and save the data.

11. The call processing device as claimed in claim 10, wherein the hardware processor is arranged to execute program modules comprising:
    an invoking module, arranged to invoke the data and display the data together with the visual menu after saving the data input by the user.

12. The call processing device as claimed in claim 9, wherein the hardware processor is arranged to execute program modules comprising:
    a second receiving module, arranged to receive a command through the visual menu after the displaying module displays the visual data as the visual menu; and
    a sending module, arranged to send the command to a provider of the voice guidance.

13. The call processing device as claimed in claim 9, wherein the displaying module comprises at least one of:
    a first displaying unit, arranged to display the visual data as the visual menu in a form of a list;
    a second displaying unit, arranged to display the visual data as the visual menu in a form of a tree structure;
    a third displaying unit, arranged to display the visual data as the visual menu in a form of organization architecture;
    a fourth displaying unit, arranged to display the visual data as the visual menu in a form of text display.

14. The call processing device as claimed in claim 13, wherein each of the first displaying unit, the second displaying unit and the third displaying unit comprises:

a first-level menu sub-unit, arranged to display one or more first-level menus; and a next-level menu sub-unit, arranged to display, after receiving a command of displaying a next-level menu of at least one menu in the one or more first-level menus, the next-level menu of the at least one menu in a form of a list.

15. The call processing device as claimed in claim 9, wherein the displaying module comprises:

an adjusting unit, arranged to determine to display all menus or display a part of menus according to a screen size of a device displaying the visual menu.

16. The call processing device as claimed in claim 9, wherein the hardware processor is arranged to execute program modules comprising:

a saving module, arranged to save the visual menu and establish a relationship between the visual menu and a number after the displaying module displays the visual data as the visual menu, wherein the relationship is used for invoking the visual menu when a user dials the number.

17. Software for performing the call processing method as claimed in claim 1.

18. A storage medium storing the software as claimed in claim 17.

* * * * *